(No Model.)
R. F. BARTEL.
BRAKE.
No. 508,269. Patented Nov. 7, 1893.
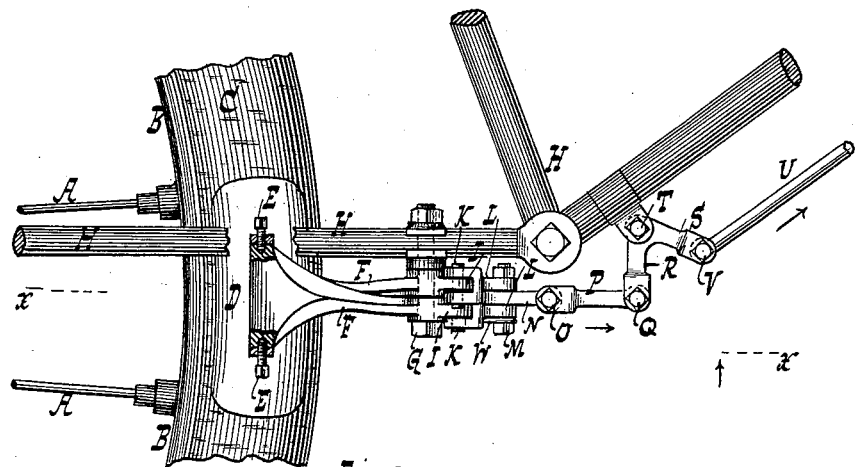
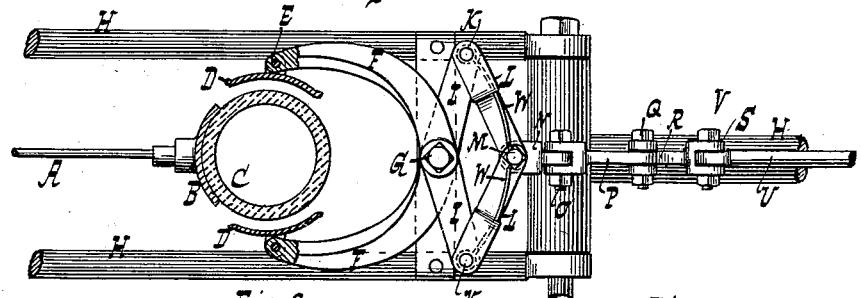
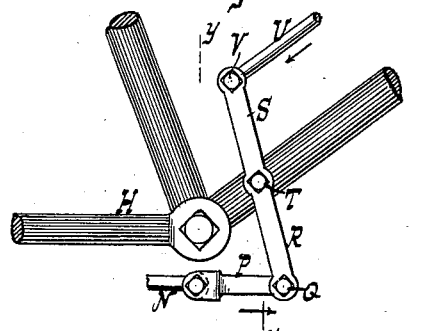
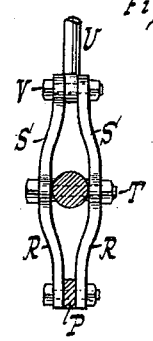
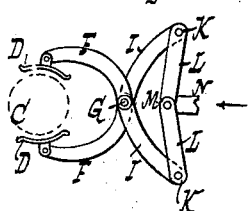
WITNESSES:
William Miller
Chas. E. Poensgen
INVENTOR:
Rudolph F. Bartel
BY
Hauff & Hauff
ATTORNEYS.

UNITED STATES PATENT OFFICE.

RUDOLPH F. BARTEL, OF BAYONNE, NEW JERSEY.

BRAKE.

SPECIFICATION forming part of Letters Patent No. 508,269, dated November 7, 1893.

Application filed April 27, 1893. Serial No. 472,098. (No model.)

*To all whom it may concern:*

Be it known that I, RUDOLPH F. BARTEL, a citizen of the United States, residing at Bayonne, in the county of Hudson and State of New Jersey, have invented new and useful Improvements in Brakes, of which the following is a specification.

The object of this invention is to provide a brake which while of simple construction, will possess considerable efficiency and the invention consists in the novel features pointed out in the following specification and claims and illustrated in the annexed drawings, in which—

Figure 1 shows a side elevation of the brake. Fig. 2 is a section along $x\,x$ Fig. 1. Fig. 3 is a side elevation of a modification. Fig. 4 is a section along $y\,y$ Fig. 3. Fig. 5 is a plan view of another modification.

In the drawings the letter A indicates spokes of a wheel.

B is the rim and C is the tire of any suitable construction, a hollow rubber or pneumatic tire such as used in bicycles being shown in the drawings, but while my invention is not limited in its application either to bicycles or to any particular construction of tire or wheel, it has particular advantages when applied to a pneumatic tire. Two brake shoes D D are located at opposite sides of the tire and are pivoted to lever arms F through the medium of pivot pins E arranged parallel to the trend of the tire. The lever arms F are fulcrumed together by a pivot G supported or applied on the frame H of the vehicle or body. The levers or lever arms F are provided with actuating arms I extending from or rigidly connected to the levers F. To the actuating arms I at K are jointed the links L said links being jointed to one another at M at which point an actuating link or connection N is jointed to the links L. The connection N is connected at O to a connection P jointed at Q to a lever R S fulcrumed at T and to which a link U is jointed at V, said link U extending to a lever or actuator (not shown) placed within reach of the driver or attendant, so as to enable the latter to brake by hand or by foot as may be desired. If the lever arm S extends downward as in Fig. 1 the connection U has to be pulled for braking, while if the lever arm S extends upward as in Fig. 3, the connection U has to be pushed to set the brake into action, but the principle of operation remains the same in both cases. When the connection U is released the spring W acting on the arms I or on the pivots K connected to said arms, will move the brake or shoes D to free the tire C. By arranging the links L as in Fig. 5 the braking action is also manifestly produced by pushing the joint M of said links toward the joint G. It may also be noted that the spring W may at times be omitted, since on the release of the brake and the commencement of rotation of the wheel the motion of the latter will tend to force away the shoes D from the wheel.

From the above description it will be seen, that when the brakeshoes D D are moved toward the tire, they are free to accommodate themselves to the opposite surfaces of the tire so that their entire surfaces will be brought into action and they are enabled to grasp the tire with sufficient force to produce the desired retarding action. This effect is particularly apparent, when my brake is applied to a pneumatic tire which when the brakeshoes are brought to bear against its opposite sides, will yield to some extent so that both brakeshoes will fully come into action.

What I claim as new, and desire to secure by Letters Patent, is—

1. The combination with a pair of brake levers suitably fulcrumed together and provided with actuating arms, of brakeshoes pivoted to the levers by pivots arranged parallel to the trend of the tire, so that the brake shoes act on the opposite sides of the tire, links jointed to said actuating arms and to one another, an actuating link or connection jointed to said links and a releasing spring connected to said arms substantially as described.

2. The combination with a pair of brake levers suitably fulcrumed together and provided with actuating arms, of brake shoes pivoted to the levers by pivots arranged parallel to the trend of the tire, so that the brake-shoes act on the opposite sides of the tire, links jointed to said actuating arms and to one another and an actuating link or connection attached to said links substantially as described.

In testimony whereof I have hereunto set my hand in the presence of two subscribing witnesses.

RUDOLPH F. BARTEL.

Witnesses:
WM. C. HAUFF,
E. F. KASTENHUBER.